Aug. 23, 1960  M. J. TAUSCHEK  2,949,907
COOLANT-FILLED POPPET VALVE AND METHOD OF MAKING SAME
Filed Dec. 19, 1957  2 Sheets-Sheet 1
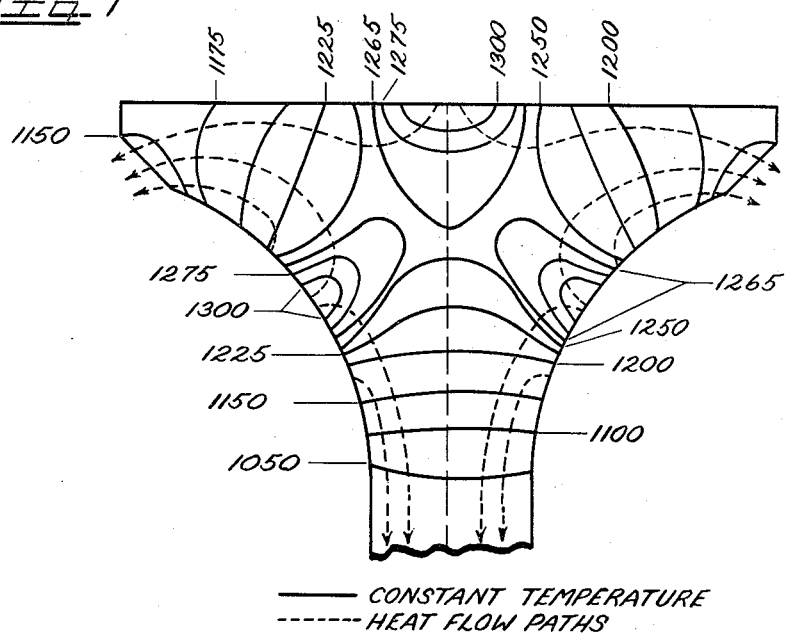
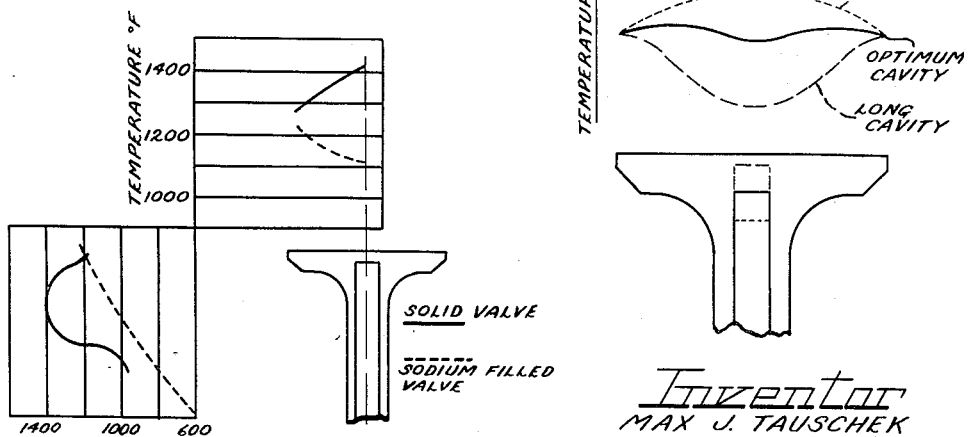
Inventor
MAX J. TAUSCHEK

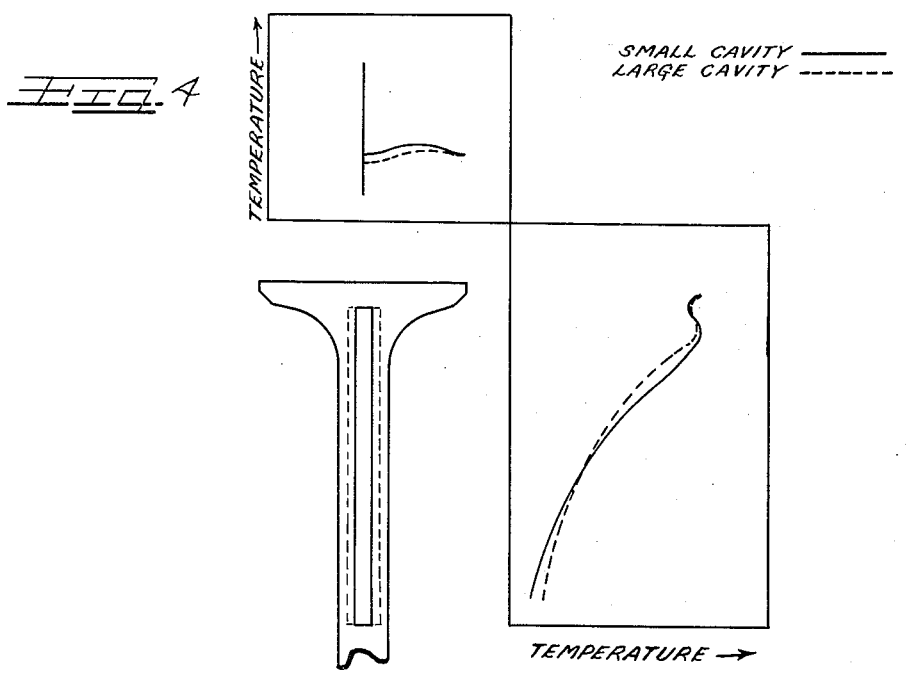
Fig. 4 VALVE SURFACE TEMPERATURES
SMALL CAVITY ———
LARGE CAVITY -------
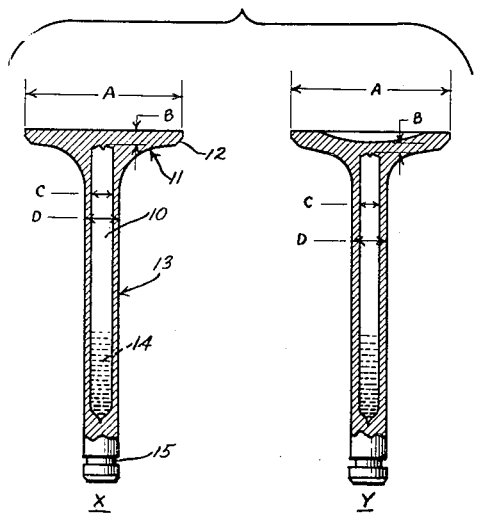
Fig. 5
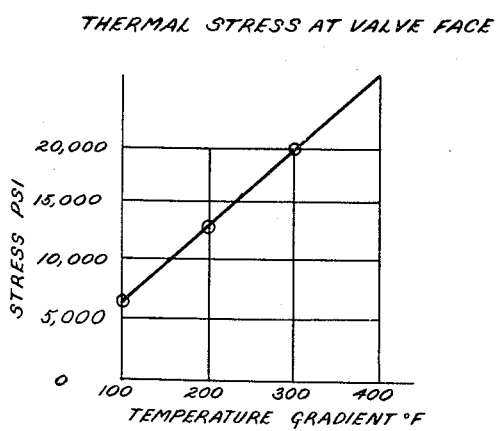
Fig. 6 THERMAL STRESS AT VALVE FACE
Inventor
MAX J. TAUSCHEK

United States Patent Office 2,949,907
Patented Aug. 23, 1960

---

2,949,907

COOLANT-FILLED POPPET VALVE AND METHOD OF MAKING SAME

Max J. Tauschek, Lyndhurst, Ohio, assignor to Thompson Ramo Wooldridge Inc., a corporation of Ohio Filed Dec. 19, 1957, Ser. No. 703,902

12 Claims. (Cl. 123—188)

The present invention relates broadly to internal combustion engine valves, and is more particularly concerned with a new and improved coolant-filled poppet valve characterized during usage by substantial freedom from cracking throughout a wide temperature range.

Considerable information has been obtained of late as to the effect of operating temperature on the performance of valves. It is now known that an increase in temperature produces a substantial decrease in the tensile strength, fatigue limit and Brinell hardness, and that a rise in temperature has a marked effect upon the yield strength, creep limits and other physical properties of the valve. Further, the corrosion weight loss of the valve and tensile stresses on the valve head rise correspondingly with each temperature increment increase.

By accurate measurements on sectioned valves, the operating temperatures to which various portions of the valve are exposed during actual operating conditions can now be reliably determined. Having concluded that radial cracking and similar valve breakdowns are related to tensile stresses, and that said stresses are a function of temperature which can now be measured throughout the valve structure, applicant has discovered that by maintaining a close and predetermined ratio relationship between the valve head thickness and head diameter, as well as a definite ratio between the stem cavity diameter and stem diameter, the temperature of these areas can be controlled and that valve breakdown from the causes mentioned can be substantially entirely eliminated.

It is therefore an important aim of the present invention to provide a new and improved coolant-filled poppet valve having a minimum temperature gradient across the head portion thereof and a marked reduction in tensile stresses whereby radial cracking and other related defects no longer occur with frequency.

Another object of the invention lies in the provision of a hollow poppet valve in which the coolant cavity length is closely related to the valve head diameter and thereby substantially even temperatures along the valve head are obtained.

Another object of the invention is to provide a hollow poppet valve in which the coolant cavity diameter is closely related to the stem diameter and temperature reductions in critical areas of the underhead section of the valve are effectively accomplished, the strength characteristics thereof at the same time being substantially improved.

Still another object of the invention is to eliminate the prior art problems of hot spots in the center of the valve head portion and in the underhead radius by providing a valve having a coolant passage related closely in length to the head diameter and in width to the stem diameter.

A further object of the invention is to provide a method of making poppet valves of the foregoing characteristics, which comprises controlling the coolant cavity length and width.

Other objects and advantages of the invention will become more apparent during the course of the following description, particularly when taken in connection with the accompanying drawings.

In the drawings, wherein like numerals are employed to designate like parts throughout the same:

Figure 1 is a cross-sectional view of a typical valve showing constant temperature profiles and heat flow paths therein;

Figure 2 is a graph comparing surface temperatures of a typical solid and sodium-cooled valve, the temperatures being plotted to coincide with particular locations on the valve;

Figure 3 is a graph plotting comparative head surface temperatures found in a coolant-filled valve having cavities of varying depths;

Figure 4 is a graph plotting surface temperatures of valves having coolant cavities of different diameters;

Figure 5 are cross-sectional views of two typical valve structures having coolant passages therein and showing the pertinent dimensions which are controlled to avoid thermal cracking in accordance with this invention; and Figure 6 is a graph plotting changes in temperature gradients across the valve head against tensile stresses.

It has been customary practice in the art, when endeavoring to solve the problem of valve breakage, to carefully examine such factors as seat run-out, thermal seal distortion, inferior valve material, bad valve seating caused by too much lash, and either a too-small or too-large underhead cross-section. It is only of late, however, after extensive investigation by applicant and others, that the extreme importance of operating temperatures on the performance of a valve has been fully realized. As for example, it is now known that a typical valve may have a variance in tensile strength from in the neighborhood of 75,000 p.s.i. at 1200° F. to around 35,000 p.s.i. at 1600° F., while the fatigue limit ($10^7$ cycles) may show a difference in the nature of 30,000 p.s.i. at 1350° F. to as low as 16,000 p.s.i. at 1500° F. Brinell hardness, on the other hand, may often show a change from about 200 at 1200° to approximately 150 at 1600° F.

Similarly, an increase in temperature produces marked effects upon such additional factors as yield strength, creep limits and the corrosion weight loss of a valve. As for example, measured in grams/$dm.^2$, a typical valve may show a corrosion weight loss of from about 0.8 at 1400° to about 90 as the temperature of the valve approaches 1800° F. Corrosion and valve burning go hand in hand, and accordingly, as the weight loss from corrosion increases, malfunctioning of the valve can shortly be anticipated.

Bearing in mind that the valve temperatures found in average passenger car engines are normally in the range of 1200 to 1300° F., while the average truck engine valve temperatures are frequently between 1400 and 1500° F., the importance of careful consideration of temperatures as a determining factor in valve life readily becomes apparent. Particularly is this so with the advent of the newer high-output passenger car engines which produce a pronounced increase in valve temperatures.

The precise temperatures to which various portions of the valve are exposed during actual operating conditions has been determined with great reliability by the assignee of the present application. This method involves essentially the making of a ferritic or martensite steel valve of such known compositions as S.A.E. 3140, Silcrome 1, or G.M. 8440, and installing said valve in an engine which is subsequently operated for a one hour or other predetermined period under desired test conditions. The valve is then removed, cut into sections and the local hardness values measured. Samples of the same lot of steel are then carefully drawn in a laboratory furnace, and the draw-curve for the particular steel is established. From this data the hardness of test valve sections can be accurately correlated with operating temperatures. This is clearly shown in Figure 1 which illustrates heat flow paths in dashed lines and constant temperature profiles in solid lines for a typical automotive exhaust valve. The hot spot in the center of the head is believed to be caused by heat input into the valve head from the combustion chamber. Most of this heat is transferred out of the head through the valve seat, which has a lower temperature. Another hot spot appearing on the underhead radius corresponds to the point of gas impingement on the valve stem. This is considered to result from heat input from the exhaust gases, and this heat is transferred to lower temperature areas at the valve base and down the valve stem. It is estimated, based upon the results shown in Figure 1, that something over one-half of the total heat absorbed by the valve leaves through the valve face.

Hollow valves provided with a coolant cavity extending substantially throughout the length thereof, into which a heat conducting medium such as sodium or a combination of sodium and mercury may be injected, have been previously employed to improve the cooling of the valve head. When such cooled valves are used, the heat is transferred by the sodium or other coolant to the stem in the valve guide area. A comparison of the temperature profiles of typical heavy-duty truck engines when utilizing solid and sodium-filled valves appears in Figure 2, which plots the temperature over the surface of the valve to coincide with particular locations on the valve itself. It may be seen therefrom that, in the case of the solid valve, a rather rapid rise in the temperature of the stem portion is experienced up to the underhead portion, while the temperature at the center of the head portion of the solid valve is rather substantial and decreases rapidly across the valve head. The sodium-cooled valve, on the other hand, has a much lower temperature at the center of the top of the head, and as the marginal edge portions of the head are approached, there is a slight temperature rise. However, it may be seen that the temperature gradient is substantially less across the head of the sodium-filled valve than in the case of the solid valve.

With respect to the stem portion of the sodium-cooled valve, and again referring to Figure 2, the rise in temperature upwardly into the stem portion is much more gradual, and during the major portion of the valve stem length, the temperature never approaches the relatively high temperature found with the solid valve. It may thus be seen that the principal effect of the sodium or other coolant is to reduce the temperature of the exceedingly hot areas at the top of the head and underhead sections of the valve. Temperature reductions in the neighborhood of 350° F. are not uncommon, particularly in the critical underhead section. Another beneficial result of sodium cooling, as noted, is that the temperature gradient across the top of the head is reduced.

The effectiveness of the coolant-filled valve as compared with a solid valve, in reducing the temperature gradient across the head portion of the valve, and in cooling the underhead portion, has been previously noted. However, investigation by applicant has also shown that the relative length of the coolant cavity bears an important relation to the ultimate temperature gradient across the head portion. This is brought out in Figure 3 which plots the relative temperatures across the head portion for short, optimum, and long cavities. While the long cavity reduces the temperature in the center of the head portion, the temperature gradient across the head portion for this type cavity is rather substantial. The short cavity, on the other hand, shows a rise in temperature as the center portion of the head is approached, and further, possesses a temperature gradient across the head portion which would be likely to induce thermal stresses. The optimum cavity, it will be noted, is relatively constant with respect to its temperature gradient from one side to the other of the head portion.

Also of importance, and particularly with respect to hot spots in the underhead portion and improving the strength characteristics therein, is the effect of increasing the diameter of the cavity. The temperature rise experienced with cavities of two different diameters as the head portion of the valve is approached are shown in Figure 4 plotted against the location on the valve itself, and there is further shown relative temperature gradients across the head. It may be seen that the temperature rise of the relatively larger cavity is more gradual as compared with the smaller cavity, and that generally across the head portion of the valve outwardly from the center thereof the temperature change encountered with the wide cavity is generally less. However, as will be noted in detail later, it is important that cavity diameter be related to stem diameter.

Of the two important temperature gradients on a valve discussed herein, that along the stem portion and that across the top of the head, the former appears at present to cause a relatively lesser amount of stress. The temperature is generally fairly uniform throughout the stem cross-section, although substantial improvement can be made, and the stem is normally free to expand within the limits of the valve lash setting. With regard to the top of the head, however, this is most frequently the critical area. The material near the center of the head is generally hottest and tries to expand, but is constrained by the relatively cool periphery at the base. This puts the circumference of the valve head in tension and the center in compression, and sets up hoop stresses which tend to cause radial and other fractures. The magnitude of these stresses has been investigated in quite some detail, as shown in the graph of Figure 6, and it has been found that a temperature gradient of 100° F. will produce a stress in the valve head measured in pounds per square inch of approximately 6500. A gradient of 200° F. results in a stress of about 13,000 p.s.i., while a gradient of 300° F. frequently produces stresses approaching 20,000 p.s.i. The importance of maintaining a minimum gradient in the valve, and thus avoiding the occurrence of thermal stresses and radial cracking, becomes even more apparent when it is understood that these cracks may cause a portion of the valve head to break away and be exhausted through the ports or cause extensive damage to other engine components. In some cases blow-by through the crack may result in channeling or guttering.

Applicant has discovered that a minimum temperature gradient may be established across the valve head portion and along the stem portion by maintaining within controlled limits a ratio between the head thickness and head diameter, as well as a ratio between the stem cavity diameter and stem diameter. This is illustrated in Figure 5 which shows two typical valve constructions X and Y provided with coolant cavities 10 therein. The valves differ in construction only in that the one designated as Y is provided with a concave head for the purpose generally of reducing the weight of the valve. In all other respects the valves X and Y are identical, each being provided with a head portion 11, beveled face 12, and stem portion 13 interiorly of which is the coolant cavity 10 containing sodium or other suitable substance 14. As is the practice, the valve stem tip is machined as shown at 15.

Upon each view of the drawing in Figure 5 there is applied the dimensions which have been established by applicant as critical in avoiding thermal stress problems. The letter A designates the head diameter, while the letter B denotes the head thickness measured from the top of the coolant cavity to the upper surface of the valve head at the center thereof. The letter C identifies the stem cavity diameter or diameter of the coolant cavity, while the letter D designates the outer diameter of the stem portion itself. It will be appreciated that the stem and cavity diameters are generally constant along the entire length of the stem, with the exception of small regions adjacent the stem tip and underhead portion, and that the measurements C and D can be taken at all other locations. While variations are of course possible in the ratio results found by applicant to date to be preferable, it is desirable that the ratio of head thickness to head diameter (B/A) be within the range of 0.050 to 0.120 inch. The ratio of stem cavity diameter to stem diameter (C/D) is preferably limited to not more than about 0.750 inch maximum. The precise minimum value of this ratio, however, will depend upon the minimum value of C, which in turn is controlled by available gun drilling size and not so much by coolant considerations. It may be seen from the foregoing relationships that the ratio B/A will generally be substantially less than the ratio C/D, and that the maximum value of C/D is approximately six times greater than the maximum value of B/A.

Set forth below in tabular form are representative dimensions of head diameter, head thickness, stem cavity diameter and stem diameter for typical valves of the coolant type having both the flush or flat type head and the concave head shown in Figure 5. This information was obtained after extensive investigation by applicant, and is the basis for the ratios above set forth.

| Type Head | A | B | C | D |
|---|---|---|---|---|
| Y | 2.593 ±.005 | .140 ±.010 | .486 ±.010 | .6825 .6820 |
| Y | 2.281 ±.005 | .125 ±.031 | .375 ±.005 | .5580 .5575 |
| X | 1.660 ±.005 | .145 ±.020 | .250 ±.005 | .4340 ±.0005 |
| X | 1.660 ±.005 | .145 ±.020 | .250 ±.005 | .4340 ±.0005 |
| X | 1.805 ±.005 | .145 ±.020 | .312 ±.005 | .4335 ±.0005 |
| Y | 2.500 ±.010 | .250 ±.020 | .312 ±.005 | .4965 ±.0005 |
| X | 1.969 ±.005 | .230 ±.020 | .312 ±.005 | .4945 ±.0005 |
| X | 1.510 ±.005 | .145 ±.020 | .250 ±.005 | .4340 ±.0005 |
| X | 1.660 ±.005 | .145 ±.020 | .3125 ±.005 | .4334 .4327 |
| X | 1.749 ±.005 | .156 ±.020 | .281 ±.005 | .4330 ±.0005 |

Valves incorporating the features of the present invention may be made by the upset method from stem size stock wherein a gather is first made at one end of the stock and the head then formed in a die. Or the extrusion process may be used in which the stem is extruded from a hot slug and the head then finish coined. Following these steps of either method, the coolant cavity may be provided by boring of the stem, or in any other suitable manner. It is of course important that the length and diameter of the cavity be carefully controlled in accordance with the teachings herein. Thereafter the coolant is injected into the cavity and the open end of the stem sealed by customary techniques.

It may be seen from the foregoing that applicant has provided a novel hollow poppet valve and method of making the same which effectively avoids the prior art difficulties of radial and other types of cracking caused by thermal stresses. By maintenance of a close relation between head thickness and head diameter, as well as a controlled relation between stem cavity diameter and stem diameter, it is apparent that a uniform temperature gradient may be established across the head and stem portions. Radial cracking which results frequently when head thickness is too great, and semi-circular cracks on the head above the cavity when the head thickness is too small, are thus effectively eliminated.

In this regard, it has been determined that the temperature gradient is preferably limited to a value such that the circumferential stress at the valve face does not exceed the tensile stress in the valve material at its operating temperature. The maximum temperature gradient is approximately 150° F., and by taking into account other tensile or mechanical stresses which may be on the valve and which are additive with the stress on the valve face, it has been found that the valve may be designed such that the gradient is essentially non-existent. Further, and without departing from the maximum value of the ratio of C/D, an increase in valve strength may be accomplished by a small reduction in cavity diameter. To explain, in a valve having a stem outer diameter of ½", a decrease in the stem cavity diameter from ⅜" in ¼" produces only a relatively small change in valve stem temperature and consequent tensile and fatigue strengths of the valve alloy. However, reducing the cavity diameter essentially doubles the cross-sectional area of the valve stem material and thus makes the valve twice as strong.

It is to be understood that the forms of the invention herein shown and described are to be taken as preferred embodiments of the same, and that various changes in the size, shape and arrangement of parts may be made without departing from the spirit of the invention and the scope of the subjoined claims.

I claim as my invention:

1. A poppet valve having a head portion and stem portion provided with a coolant cavity extending substantially throughout the length thereof and being of essentially constant diameter throughout said length, the ratio of the thickness of the head portion, measured between the center of said portion and the top of the coolant cavity, to the head diameter being substantially less than the ratio of the coolant cavity diameter to the stem portion diameter, to thereby maintain a minimum temperature gradient along the head and stem portions and avoid thermal stresses therein.

2. A poppet valve having a head portion and stem portion provided with a coolant cavity extending substantially throughout the length thereof, the ratio of the coolant cavity diameter to stem portion diameter being approximately six times greater than the maximum value of the ratio of the thickness of the head portion, measured between the center of said portion and the top of the coolant cavity, to the head portion diameter, to thereby maintain a minimum temperature gradient along the head and stem portions and avoid thermal stresses therein.

3. A poppet valve having a head portion and stem portion provided with a coolant cavity extending substantially throughout the length thereof, the ratio of the thickness of the head portion, measured in inches between the center of said portion and the top of the coolant cavity, to the head portion diameter measured in inches being between approximately 0.050 and 0.120, to thereby maintain a minimum temperature gradient along the head portion and avoid thermal stresses therein.

4. A poppet valve having a head portion and stem portion provided with a coolant cavity extending substantially throughout the length thereof, the ratio of the thickness of the head portion, measured in inches between the center of said portion and the top of the coolant cavity, to the head portion diameter measured in inches being not more than approximately 0.120, and the ratio measured in inches of the coolant cavity diameter to stem portion diameter being not more than about 0.750, to thereby maintain a minimum temperature gradient along the head and stem portions and avoid thermal stresses therein.

5. A poppet valve having a head portion and stem portion provided with a coolant cavity extending substantially throughout the length thereof, the ratio of the thickness of the head portion, measured in inches between the center of said portion and the top of the coolant cavity, to the head portion diameter measured in inches being not less than about 0.050, and the ratio measured in inches of the coolant cavity diameter to stem portion diameter being not more than about 0.750, to thereby maintain a minimum temperature gradient along the head and stem portions and avoid thermal stresses therein.

6. A poppet valve having a head portion and stem portion provided with a coolant cavity extending substantially throughout the length thereof, the ratio of the thickness of the head portion, measured in inches between the center of said portion and the top of the coolant cavity, to the head portion diameter measured in inches being between approximately 0.050 and 0.120, and the ratio measured in inches of coolant cavity diameter to stem portion diameter being not more than about 0.750, to thereby maintain a minimum temperature gradient along the head and stem portions and avoid thermal stresses therein.

7. A method of making a poppet valve having minimum temperature gradients along the head and stem portions thereof, which comprises forming a valve blank to provide head and stem portions thereon, boring the stem portion along its length to provide a coolant cavity and head thickness thereabove, measured from the top of said cavity to the upper surface of the head at the center thereof, the ratio of which to head diameter is substantially less than the ratio of coolant cavity diameter to stem diameter, injecting a coolant into the cavity, and sealing the bottom of the stem portion.

8. A method of making a poppet valve having a minimum temperature gradient along the head portion thereof, which comprises forming a valve blank to provide head and stem portions thereon, boring the stem portion along its length to provide a coolant cavity and head thickness thereabove, measured from the top of said cavity to the upper surface of the head at the center thereof, the ratio of which to head diameter is between approximately 0.050 and 0.120 inch, injecting a coolant into the cavity, and sealing the bottom of the stem portion.

9. A method of making poppet valve having minimum temperature gradients along the head and stem portions thereof, which comprises forming a valve blank to provide head and stem portions thereon, boring the stem portion along its length from the end opposite the head portion to provide a coolant cavity having a diameter the ratio of which to stem portion diameter is not more than about 0.750 inch, controlling the depth of the coolant cavity to a distance which provides a head portion thickness, measured from the top of the cavity to the upper surface of the head at the center thereof, the ratio of which to head diameter is not less than about 0.050 inch, injecting a coolant into the cavity, and sealing the end stem portion opposite the head portion.

10. A method of making a poppet valve having uniform temperature gradients along the head and stem portions thereof, which comprises forming a valve blank to provide head and stem portions thereon, boring the stem portion along its length from one end thereof to provide a coolant cavity having a diameter the ratio of which to the stem portion diameter is not more than about 0.750 inch, controlling the depth of the coolant cavity to a distance which provides a head portion thickness, measured from the top of the cavity to the upper surface of the head at the center thereof, the ratio of which to the head diameter is between approximately 0.050 and 0.120 inch, injecting a coolant into the cavity and sealing the end of the stem portion opposite the head portion.

11. A method of minimizing temperature gradients along the head and stem portions of coolant filled poppet valves, which comprises controlling the head thickness and diameter of the valve head to provide a first ratio, and controlling the diameter of the stem cavity and the stem diameter to provide a second ratio which is substantially greater than the first ratio.

12. A method of making sodium cooled poppet valves having enhanced resistance to cracking at elevated temperature operating conditions, which comprises forming a metal poppet valve blank having a hollow stem portion, providing a stem cavity extending into the valve head, controlling the ratio of the stem cavity diameter to the external stem diameter to provide a ratio of not more than about 0.750 inch, and controlling the head thickness at the end of the stem cavity relative to the diameter of the head to provide a ratio of not less than about 0.050 inch, partially filling the stem cavity with sodium, and sealing the sodium in said cavity.

References Cited in the file of this patent

UNITED STATES PATENTS

| | | |
|---|---|---|
| 2,238,628 | Daisley | Apr. 15, 1941 |
| 2,371,548 | Saffady | Mar. 13, 1945 |
| 2,394,177 | Hoern | Feb. 5, 1946 |
| 2,471,948 | Gibian et al. | May 31, 1949 |
| 2,610,279 | Perkes | Sept. 9, 1952 |
| 2,682,261 | Achor | June 29, 1954 |